No. 849,270. PATENTED APR. 2, 1907.
A. SCHAFER & G. WANEE.
TRUCK.
APPLICATION FILED MAY 15, 1906.
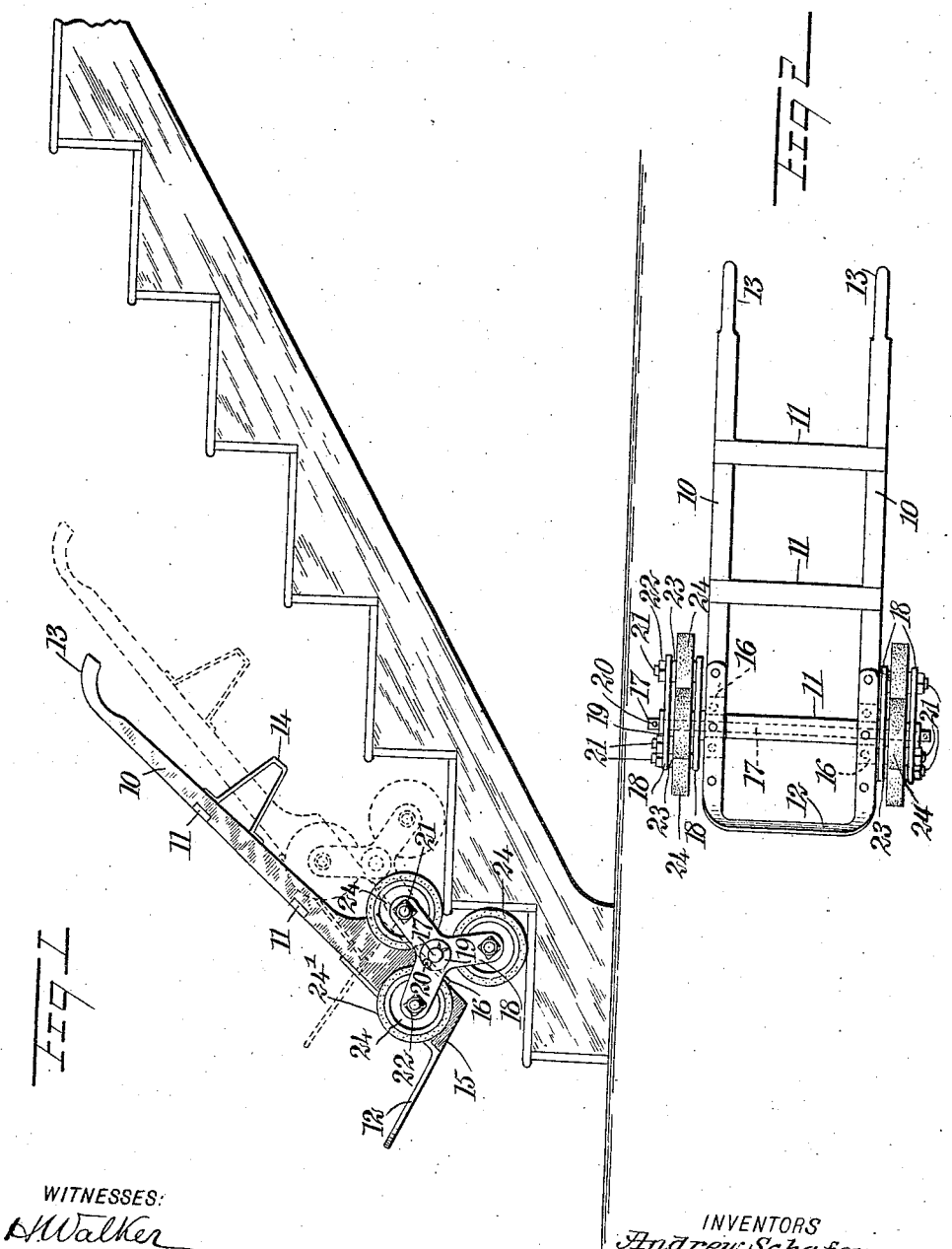
WITNESSES:
H. Walker
A. Russell Bond
INVENTORS
Andrew Schafer
George Wanee
BY Munn & Co
ATTORNEYS

UNITED STATES PATENT OFFICE.

ANDREW SCHAFER AND GEORGE WANEE, OF RED BLUFF, CALIFORNIA.

TRUCK.

No. 849,270.  Specification of Letters Patent.  Patented April 2, 1907.

Application filed May 15, 1906. Serial No. 316,930.

*To all whom it may concern:*

Be it known that we, ANDREW SCHAFER and GEORGE WANEE, both citizens of the United States, and residents of Red Bluff, in the county of Tehama and State of California, have invented a new and Improved Truck, of which the following is a full, clear, and exact description.

Our invention relates to trucks, more particularly hand-trucks, and has for its object the provision of a novel construction permitting the truck to be readily wheeled up and down stairs or steps, as well as on a plane surface.

Our invention consists of novel features and parts and combinations of the same, which will be more fully described hereinafter and pointed out in the claim.

Reference is to be had to the accompanying drawings, forming a part of this specification, in which similar characters of reference indicate corresponding parts in both figures.

Figure 1 is a side elevation of the truck, showing it in use on a stairway; and Fig. 2 is a plan view of the truck.

The truck comprises a bed formed of side beams 10 and cross-bars 11, the latter being mortised in the side beams, so that their upper faces will lie flush with the upper faces of the side beams. Fastened to the forward end of the bed is a toe-piece 12 of the usual form. The side beams 10 at the opposite end of the truck are formed with handles 13, and secured to these beams adjacent to the handles are legs 14. The side beams 10 are preferably formed with a deeper portion 15 at their forward ends.

Brackets 16 are secured to the under face of the beams 10 near their forward ends, and in these brackets the shaft 17 is mounted. Mounted to turn on the shaft 17 at each end is a truck-frame. Each truck-frame consists of two similar spider or star frames 18, held in position on the shaft 17 by a washer 19 and a pin 20. The members 18 are preferably formed with three arms projecting radially and at equal angles from a central hub. The two star-frames are clamped together by means of bolts 21 and nuts 22 at the end of the arms and are spaced apart by means of sleeves 23, carried on these bolts. On each sleeve a wheel 24 is mounted to turn, and each wheel is preferably provided with a rubber tire 24'.

In operation when the truck is being wheeled along on a level two of the wheels 24 will engage the ground. When, however, the truck is being wheeled up a stairway the truck-frames 18 will revolve bodily on the shaft 17, carrying the wheels with them. In Fig. 1 the dotted lines illustrate the position of the wheel when riding on a stair-tread, while in full lines is illustrated the position of the wheels when mounting from one step to another, the action being somewhat similar to that of a gear on a rack. In practice the length of the arms of the members 18 must be so chosen as to make the distance from the center of one wheel to the center of the next wheel approximately equal to the height of the average step.

It will be evident that this construction can be applied to trucks or vehicles of other types as well as the one shown, and we wish it to be distinctly understood that we do not limit ourselves to the use of this construction for hand-trucks alone. If found desirable, the number of rollers on each truck-frame may be increased, and we wish it understood that such a modification of the construction is included in our invention.

Having thus described our invention, we claim as new and desire to secure by Letters Patent—

A truck comprising a main frame, a shaft journaled transversely of the frame, truck-frames on the ends of the shaft outside of the main frame, each of said truck-frames comprising a plurality of plates spaced apart from each other, and each provided with radial arms, the arms on one plate registering with the arms on the other plate, sleeves between the plates, bolts traversing the plates and the sleeves whereby to secure said plates together, and wheels journaled between each pair of arms.

In testimony whereof we have signed our names to this specification in the presence of two subscribing witnesses.

ANDREW SCHAFER.
GEORGE WANEE.

Witnesses:
CHARLES H. BARROUGH,
PAUL STULL.